United States Patent
Wu

(10) Patent No.: US 8,862,179 B2
(45) Date of Patent: Oct. 14, 2014

(54) HAND-HELD DEVICE INTEGRATING COMPUTER AND CELL PHONE

(76) Inventor: Wei Wu, Guangdong (CN)

( * ) Notice: Subject to any disclaimer, the term of this patent is extended or adjusted under 35 U.S.C. 154(b) by 427 days.

(21) Appl. No.: 13/265,543

(22) PCT Filed: Apr. 20, 2009

(86) PCT No.: PCT/CN2009/071373
§ 371 (c)(1),
(2), (4) Date: Oct. 20, 2011

(87) PCT Pub. No.: WO2010/121412
PCT Pub. Date: Oct. 28, 2010

(65) Prior Publication Data
US 2012/0040714 A1 Feb. 16, 2012

(51) Int. Cl.
*H04M 1/00* (2006.01)
*H04B 1/38* (2006.01)
*H04W 76/02* (2009.01)

(52) U.S. Cl.
CPC ............ *H04B 1/3877* (2013.01); *H04W 76/025* (2013.01)
USPC ...................... 455/552.1; 455/556.1; 455/557; 455/566

(58) Field of Classification Search
CPC .......... G06F 9/544; G06F 9/46; G06F 9/461; G06F 9/467; G06F 9/50; H04B 1/3877; H04W 76/025; H04W 88/02; H04W 88/06; H04M 1/725; H04M 7/1205; H04M 7/0021; H04M 7/0012; H04M 7/0024; H04M 7/0027; H04M 2201/00; H04M 2201/32; H04M 2242/00; H04M 2242/16; H04M 1/42519

USPC ................ 455/66.1, 344, 346–348, 418–420, 455/550.1, 552.1, 553.1, 556.1–556.2, 455/557–558, 572, 574, 566
See application file for complete search history.

(56) References Cited

U.S. PATENT DOCUMENTS

| 5,799,068 | A | * | 8/1998 | Kikinis et al. | ............. 379/93.06 |
| 6,985,753 | B2 | * | 1/2006 | Rodriguez et al. | ......... 455/550.1 |
| 7,176,961 | B2 | * | 2/2007 | Shimamura | ............. 348/207.99 |
| 8,160,564 | B1 | * | 4/2012 | Gunasekara et al. | ......... 455/419 |
| 8,584,043 | B2 | * | 11/2013 | Cho et al. | ...................... 715/838 |
| 2003/0087682 | A1 | * | 5/2003 | Cathey et al. | ................. 455/574 |

(Continued)

FOREIGN PATENT DOCUMENTS

| CN | 200997089 Y | 12/2007 |
| CN | 101106616 A | 1/2008 |
| CN | 201251779 Y | 6/2009 |
| CN | 101470628 A | 7/2009 |

*Primary Examiner* — Meless Zewdu
(74) *Attorney, Agent, or Firm* — Cheng-Ju Chiang

(57) ABSTRACT

The hand-held device integrating computer and cell phone and a method for realizing the same. The hand-held device includes: a computer mode processing module; a cell phone mode processing module; a shared storing module connected both to the computer mode processing module and cell phone mode processing module; a shared processing module connected to all of the computer mode processing module, cell phone mode processing module and shared storing module for responding to the selection of the user and enabling the computer mode processing module or cell phone mode processing module; and a power supply module for supplying working power to the computer mode processing module, cell phone mode processing module, shared processing module or shared storing module. By this way, the computer and cell phone are combined together to form a hand-held terminal device capable of being received into a pocket.

6 Claims, 2 Drawing Sheets

(56) References Cited

U.S. PATENT DOCUMENTS

| | | | |
|---|---|---|---|
| 2004/0041792 A1* | 3/2004 | Criscione .................... 345/169 |
| 2004/0082362 A1* | 4/2004 | Peng et al. ................ 455/556.2 |
| 2005/0125570 A1* | 6/2005 | Olodort et al. ................ 710/15 |
| 2006/0079277 A1* | 4/2006 | Ditzik .................... 455/556.1 |
| 2007/0166091 A1* | 7/2007 | Griffin ........................ 400/486 |
| 2008/0195627 A1* | 8/2008 | Bredin et al. ................ 707/10 |
| 2008/0227483 A1* | 9/2008 | Kuhl et al. ................ 455/552.1 |
| 2010/0086111 A1* | 4/2010 | Gruchala et al. ........... 379/93.17 |

* cited by examiner

HAND-HELD DEVICE INTEGRATING COMPUTER AND CELL PHONE

CROSS REFERENCE TO RELATED APPLICATIONS

The present application is a 35 U.S.C. §371 National Phase conversion of International (PCT) Patent Application No. PCT/CN2009/071373, filed on Apr. 20, 2009, the disclosure of which is incorporated by reference herein. The PCT International Patent Application was published in Chinese.

FIELD OF THE INVENTION

The invention relates to computer, telecommunication and network field and more particularly, the invention relates to a hand-held device integrating computer and cell phone and the method for realizing the same.

BACKGROUND OF THE INVENTION

With the development of communication technology, telecommunication service is on its way shifting to comprehensive information service in which fixed service is integrated with mobile service and voice application is combined with internet application. The wireless broadband network terminal integrated with voice and/or data communication service will generate great value.

There is stronger need than ever before for mobile office. Consumers always pursue voice communication and access to internet anywhere (such as places they often visit, for example airport, hotel, leisure plaza, coffee house, subway and suburb park) and anytime without any geographical limitation.

Two major technical solutions are employed currently for meeting the above needs. One solution involves use of palmtop (PDA) or smart phone. The other solution relates to combination of the mobile phone with a portable computer.

Imbedded software may be used to incorporate function of PDA into the mobile phone so as to perform personal information management such as management of contact persons, tasks, schedule, note and so on. In addition, under condition of narrow bandwidth network, internet applications concerning processing of word and small-sized pictures such as browsing websites and receiving and sending emails can be realized. However, the basic framework of the PDA phone is different from X86-featured framework of a general computer and suffers from many disadvantages some of which may include low hardware configuration, unchangeable software curing, great difference of standards, bad interchangeability, bad extendibility and complexity of operation. When applied in environment of broadband mobile internet, the above disadvantages will become the major bottleneck of the downloading speed and network application.

In countries where 3 G/3.5 G communication techniques are available, many people currently employ the mobile solution in which a general notebook computer is combined with a cell phone. In other words, the cell phone is used to implement voice communication and PIM management, while the notebook computer is employed to realize wideband internet access and mobile office computation. The main shortcomings of the above solution lie in its inconvenience of transportation due to large size, necessity of two separate power supplies, expansive purchase and usage cost, difficulty in comprehensive management of voice and data service, as well as necessity of frequent update.

SUMMARY OF THE INVENTION

One object of the present invention is to provide a hand-held device integrating computer and cell phone and a method for realizing the same. By this way, the computer and cell phone are combined together to form a hand-held terminal device capable of being received into a pocket. The terminal device can process simultaneously voice service and data service with high speed. In addition, the device can be carried with and used by the user conveniently. This device not only provides large storage and high speed computation to the cell phone of an individual user, provides comprehensive voice function and free access to internet to the general computer, but also creates a mobile platform on which comprehensive and uniform management of the voice service and data service is obtained, thus meeting the requirement of wideband mobile internet environment.

To realize the above object, there is provided a hand-held device which includes:

a computer mode processing module for processing data service according to computer mode;

a cell phone mode processing module for processing voice service according to cell phone mode or functioning as a modem of the computer mode processing module to access into a data service network;

a shared storing module connected both to the computer mode processing module and cell phone mode processing module for storing therein important data which may be shared when the computer mode processing module is processing the data service or when the cell phone mode processing module is processing the voice service;

a shared processing module connected to all of the computer mode processing module, cell phone mode processing module and shared storing module for responding to the selection of the user and enabling the computer mode processing module or cell phone mode processing module; and a power supply module for supplying working power to the computer mode processing module, cell phone mode processing module, shared processing module or shared storing module.

The invention also provides a method for integrating a computer and cell phone, including the following steps:

Processing data service by a computer mode processing module according to computer mode, processing voice service by a cell phone mode processing module according to cell phone mode or accessing into a data service network by said cell phone mode processing mode which functions as a modem of the computer mode processing module, and supplying the power to said computer mode processing module and cell phone mode processing module by a power supply module;

Storing important data into a shared storing module, said important data being shared when the computer mode processing module is processing the data service or when the cell phone mode processing module is processing the voice service; and Responding to the selection of the user and enabling the computer mode processing module or cell phone mode processing module by a shared processing module.

Preferably, the shared storing module is a solid state disk.

The shared important data may include communication information, multi-media file information and safety certificate information required when processing data service and voice service. Moreover, display interface is provided by a display module when said computer mode processing module is handling data service or when said cell phone mode processing module is handling voice service. Human-machine interactive input processing is provided by an input module when said computer mode processing module is handling data service or when said cell phone mode processing module is handling voice service.

Preferably, the display module is a display with two or more screens. The input module may include a QWERTY keyboard and digital keyboard, or a QWERTY keyboard and digital keyboard realized by a touch screen or electromagnetic screen. Alternatively, the display module may be a single display, and the shared processing module is provided with a quick shifting key for shifting between the voice service and data service.

Compared to prior art, the present invention has the following advantages.

The hand-held device according to the invention contains not only the computer mode processing module for handling data service, but also the cell phone mode processing module for handling voice service, thereby realizing handling of data service and voice service at the same time. In addition, the hand-held device of the invention is convenient to carry and can meet the demand of mobile office and communication.

Furthermore, in the invention, the important data shared by the users may be stored into the shared storing module, hence enhancing security of data storage. At the same time, data synchronization between the cell phone and computer becomes also unnecessary.

Moreover, the cost is also effectively reduced since the computer mode processing module and cell phone mode processing module are supplied with power by the same power supply module.

The preferred embodiments of the present invention will be discussed in detail with reference to the accompanying drawings.

DETAILED DESCRIPTION OF THE INVENTION

Figure 1:
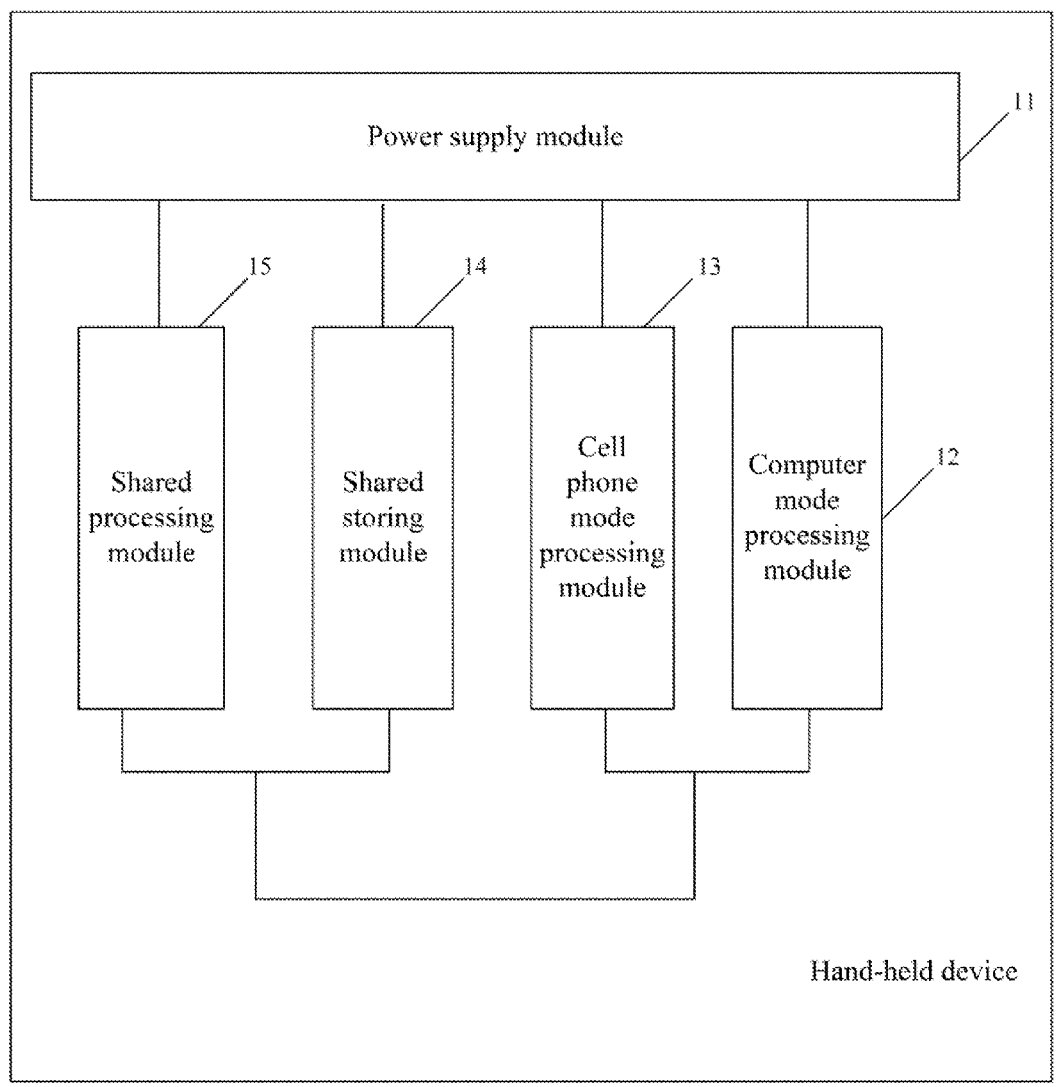
FIG. 1 shows a block diagram depicting the major modules of a hand-held device of the invention for integrating a computer mode processing module and cell phone mode processing module together.

Reference is made to FIG. 1 which shows a block diagram depicting the major modules of a hand-held device of the invention for integrating a computer mode processing module and cell phone mode processing module together.

In this embodiment, the core modules of the hand-held device for realizing integration of the computer mode processing module and cell phone mode processing module are illustrated. As shown in the figure, a power supply module 11 constructed by a rechargeable battery may supply power simultaneously to a computer mode processing module 12 and a cell phone mode processing module 13. Data service and voice service are implemented at the same time by a computer system and cell phone system respectively. As a result, voice service and data service are handled at the same time by a single device. The rechargeable battery described above may be a Lithium battery with the voltage of 3.7 V and current of 6000 mA. In addition, a shared storing module is provided to connect to both the computer mode processing module 12 and cell phone mode processing module 13. The module 14 may be used to store important data which may be shared when the module 12 is processing data service or when the module 13 is processing voice service, thereby reducing possibility of data lost caused by virus infection or manual operation error. In addition, data synchronization operation between different devices becomes also unnecessary. Furthermore, a shared processing module 15 is also connected with the modules 12 and 15 for responding to the selection of the user and enabling corresponding computer mode processing module 12 or cell phone mode processing module 13. Particularly, the shared processing module 15 may be equipped with a quick shifting key for shifting between voice service and data service.

According to the embodiment, both 2G and 3G/4G network supported hand-held devices can realize synchronous handling of voice service and data service. For example, in indoor environment such as office room, home, coffee room, airport, hotel and the like, the user may get access to internet via ADSL cable or WiFi wireless manner. The cell phone mode processing module 13 may be used to send or receive calls at the time the computer mode processing module 12 is handling data service, thus arriving at synchronous handling of data and voice services.

For example, in case of 3G/4G, a carrier wave may carry both voice service and data service. Therefore, in outdoor environment, the cell phone mode processing module 13 may function as a modem of wireless wide area network (WWAN). The cell phone mode processing module 13 may process voice stream, while the computer mode processing module 12 on the same carrier wave may handle data stream at the same time. The handling of the data stream and voice stream may be performed simultaneously without interference between each other. Downloading and uploading of data may not be interrupted by receiving of the incoming call. When real time data stream such as voice and video is transmitted, user datagram protocol (UDP) may be used to send data. When data packet is transmitted, transmission control protocol/internet protocol (TCP/IP) may be used. When the user selects to apply the priority level to UDP packet, the wireless communication protocol may be changed to realize better voice communication. Additionally, the user may define priority level of the UDP stream according to requirement so as to ensure sufficient bandwidth is prepared for the UDP stream. In case no UDP stream exists, the bandwidth prepared for the UDP stream may also be used by other data stream.

The detailed operation procedure of the hand-held device of the invention is described as follows.

Processing data service by a computer mode processing module according to computer mode, processing voice service by a cell phone mode processing module according to cell phone mode or accessing into a data service network by said cell phone mode processing mode which functions as a modem of the computer mode processing module, and supplying the power to said computer mode processing module and cell phone mode processing module by a power supply module;

Storing important data into a shared storing module, said important data being shared when the computer mode processing module is processing the data service or when the cell phone mode processing module is processing the voice service; and Responding to the selection of the user and enabling the computer mode processing module or cell phone mode processing module by a shared processing module.

The detailed construction of the computer mode processing module 12 and cell phone mode processing module 13 is described below.

The computer mode processing module 12 may include a computer operating system such as XP Tablet. In addition, it may also include a computer memory such as RAM 1G, a computer processor such as CPU 1.8G, and a built-in storage such as 1.8 inch HD 30G-120G. The built-in storage may take the form of HDD (hard disk drive) disk, SSD disk or HHD disk.

The cell phone mode processing module 13 may include a cell phone operating system such as Windows Mobile, cell phone processor such as MCY 400M, and a memory such as ROM 64M or RAM 64M.

The shared storing module 14 only stores important information for example communication information, multimedia file and safety certificate. Other information such as irrelevant application software is not stored in the module 14. The shared storing module 14 may be implemented by a solid state disk (SSD) which may be identified as a storage card in cell phone mode and identified as F disk in computer mode. The readout format and save format may be read out by the cell phone mode processing module 13 and computer mode processing module 12. In addition, both the modules 12 and 13 may change and set the priority of the module 14. Complex input may be performed through a computer interface, while simple input may be operated through a cell phone interface.

The built-in storage of the module 12 is compared to the shared storing module 14.

The built-in storage may be an HDD disk which is cheap. In addition, the storage capacity and speed of an HDD disk is improved dramatically. However, the construction of a conventional HDD disk is maintained unchanged. Mechanical physical structure is still the main design of an HDD disk and, data is stored in sectors of a disk. Consequently, when in working state, physical shock may cause damage to the disk and therefore result in complete damage of valuable data. In extreme cases, for example when a notebook computer is moved (such as a user carried with the notebook computer is walking around the street, or riding on a crowded bus), slight bump may influence safety of the data stored on the disk.

The shared storing module 14 may be implemented by a solid state disk (SSD). The SSD disk employs FLASH chip as its storage medium. The normal operation of the SSD disk may not be influenced even during high speed movement or in tilting or tipping state. Possibility of data damage may be reduced greatly even when the notebook computer drops accidently or collides with hard object, thereby providing better anti-shock performance. In this case, data may be stored for a longer time, desired data may be retrieved more quickly, and power consumption may be less. In addition, the SSD disk has good shock-resistance and better reliability.

Based on above comparison between HDD disk and SSD disk and under consideration of low cost of HDD disk and high cost of SSD disk, HDD disk may be used as hard disk of large capacity in mobile environment, while SDD disk with capacity of 1G-4G may be used to store important data such as communication information, multimedia information and safety certificate information. Accordingly, large storage capacity with low cost is ensured. Moreover, important data is also protected safely. In addition, power consumption is reduced effectively, thus adapting to mobile office environment.

The safety certificate information may include certificate information which is required when the user visits online bank, online security, and internal authority information used for a company or government.

It is noted that the device of the invention may still employ independent SSD disk to store important data such as communication information, multimedia information and safety certificate information even when in future the cost of SSD disk or HHD hybrid disk is greatly reduced to cost level of current HDD. By doing so, the important data and other data may be separated from each in the term of physical space. For example, the important data stored in a same SSD disk may be safe and reliable. Therefore, virus infection and deletion operation due to manual operation error may be avoided effectively. Data damage may also be avoided.

In addition, the hand-held device according to the invention may be a notebook with the weight of about 500g and size of 150mm×80mm×25mm (W×H×D).

Figure 2:
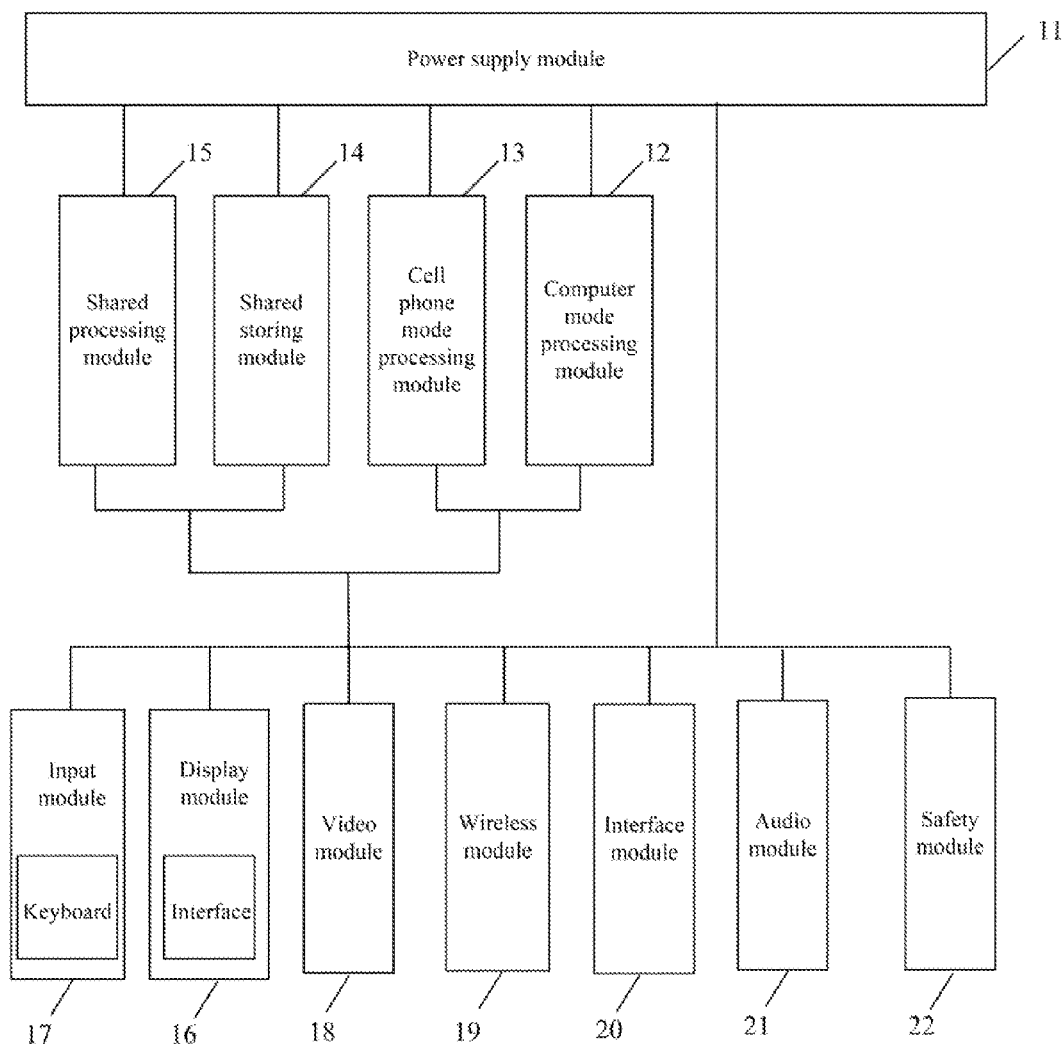
FIG. 2 shows a preferred embodiment of the hand-held device of the invention for integrating a computer mode processing module and cell phone mode processing module together.

Reference is made to FIG. 2 which shows a preferred embodiment of the hand-held device of the invention for integrating a computer mode processing module and cell phone mode processing module together.

The hand-held device in this embodiment may include a power supply module 11, a computer mode processing module 12, a cell phone mode processing module 13, a shared storing module 14, a shared processing module 15, a display module 16 and an input module 17.

In addition, in the present embodiment, the display module 16 connected to the shared processing module 15 may be a display interface shared by the computer mode processing module 12 and cell phone mode processing module 13. Particularly, the display module 16 may be a single screen display such as a 5 inch touch screen or electromagnetic screen (LED backlight with size of 3-7 inch, and default resolution of 800×480, and support of largest resolution of 1280×800). Alternatively, the display module 16 may be a display with two or more screens. In other words, the computer mode processing module 12 and cell phone mode processing module 13 use different displays.

The input module 17 may be used by the user to input information into the computer mode processing module 12 and cell phone mode processing module 13. For example, when the display module 16 is a display with two or more screens, a QWERTY big keyboard and a numerical keyboard may be used as the input module so as to input information into both the computer mode processing module 12 and cell phone mode processing module 13.

In addition, the hand-held device of the present embodiment may also include the following shared modules:

A video input module 18 such as a camera with the pixel number of 1.3M for inputting video information by the user;

A wireless module 19, such as wireless area network (WLAN), Bluetooth, global system for mobile communication (GSM)/code division multiple access (CDMA), and WWAN (WCDMA, TD-SCDMA, CDMA EVDV, HSDPA and Wi-MAX);

An interface module 20 such as an USB port, network card, VGA, SD, GPS, 3.5mm earphone and microphone, and IEEE 1394 port for providing kinds of interfaces for physical devices;

An audio module 21 such as built-in speaker (double audio channels) and built-in microphone (mono audio channel) for inputting audio information;

A safety module 22 for improving safety by means of fingerprint recognition; and A module for automatically rotating the screen, and zooming in and out the screen.

It is noted that the hand-held device of the invention may use different network access solutions when facing different network conditions. Take as an example, in case of 2G environment, indoor voice service may be realized by VOIP wideband network phone for free, and outdoor voice service may be implemented by paid voice phone service, thus reducing communication fees effectively. Comparatively, in case of 3G/4G mobile wideband internet environment, both of the indoor and outdoor voice service may be realized through VOIP wideband network phone for free, thus realizing dialing domestic and international long distance calls and local calls without any charge.

In addition, the hand-held device of the invention is a dual modular terminal supporting both 3G and WLAN modes. In the coverage of WLAN, the terminal may access preferably into WLAN since this will reduce the service fees of the user and the bandwidth of data service is more sufficient. The terminal may automatically shifts to 3G networks when it is not covered by WLAN network, thus realizing continuity of the voice between WLAN network and 3G networks. Bu this way, a voice service with high quality and low cost is provided.

Said VOIP may be used in many situations such as communication between office rooms, complex point to point telephone meeting and whiteboard system and so on. In addition, it may be based on real time working mode. Moreover, it may also provide voice service of storage-forward mode. The real time working mode is compatible with the storage-forward working mode.

In addition, during transfer of information by the hand-held device of the invention, an email address of virtual world may be correlated to a cell phone number of real world so as to provide personal identification number. As such, short message and email transmitted by the user will carry encrypted identification number containing both the email address and cell phone number. The receiving party must return the same identification number so as to receive the short message and email by the sending party. Otherwise, they will be refused by the sending party. By this way, the number of junk email and short message will be decreased significantly. Furthermore, the encrypted identification number may also be used as personal identification mark or authentication of online bank, online security, BBS and blogs, as password of service authentication management, thus greatly enhancing online credit system construction and promoting application of electronic commerce. By the same reason, online bank, online security, online forum and blogs may also use this kind of identification number, retrieve the email address, IP address and cell phone number of the user by decrypting method, thereby locating with high precision the ID and location of the use in both the virtual and real world, thus further reducing network crimes and network violence.

It is noted that the hand-held device of the invention is compatible with the Next Generation Network the core technology of which focuses on IP Multimedia Subsystem (IMS). The NGN may include real time or non-real time information service, multimedia call voice service, enhanced call management, group service and so on. In addition, different communication medium can be combined together. Information can be shared in real time and online manner, and one data document can be handled simultaneously in real time by multiple users. The NGN may also include online entertainment focusing on multimedia interactive applications such as games played by multiple users.

Additionally, there exist various types of communication tools in our modern life such as general voice telephone, VOIP telephone, visual telephone, short message service, multimedia messaging service, email, and instant chatting tool. By using the computer mode processing module and cell phone mode processing module, the hand-held device of the invention can search, manage and track on one platform many clients who use different communication tools, thereby greatly improving satisfaction of the clients and working efficiency. For example, some clients wish to use only email communication tool, some clients wish to use only telephone communication tool, some wish to use only instant tool such as QQ, while some clients wish to use only short message tool. Tracking a huge number of clients using different manners and on different devices will of course result in great difficulty, and increase working burden and pressure. For instance, it may be dislikable to repeatedly send the same information (previously sent to the client via email) to the client through telephone, short message and so on. Comparatively, the device of the invention is capable of searching, managing and track, on the same platform and at the same time, a large number of clients who use different communication tools, thereby effectively improving satisfaction of the clients and working efficiency. Dissatisfaction felt by the client due to repetitive transmission of the same information to the same client by different communication tools is effectively avoided. In addition, difficulty in comprehensively managing all of voice and data caused by distribution of the communication and data on different devices and incomplete synchronization is also largely overcome. This is significant especially for commercial clients. Voice service and data service are integrated effectively by means of combined communication. By this way, commercial information is largely and affirmatively integrated into internal management and business procedure.

What disclosed is only preferred embodiment of the invention and it is not intended to limit the scope of the invention to such embodiments. The invention covers all these equivalent changes made according to the invention.

What is claimed is:

1. A hand-held device integrating computer and cell phone, comprising:
   a computer mode processing module for processing data service according to the computer mode;
   a cell phone mode processing module for processing voice service according to the cell phone mode or functioning as a modem of the computer mode processing module to access into a data service network;
   a shared storing module connected both to the computer mode processing module and the cell phone mode processing module for storing therein data which is to be shared when the computer mode processing module is processing the data service or when the cell phone mode processing module is processing the voice service;
   a shared processing module connected to the computer mode processing module, the cell phone mode processing module and the shared storing module for responding to selections of an user and enabling the computer mode processing module or the cell phone mode processing module;
   a power supply module for supplying working power to the computer mode processing module, the cell phone mode processing module, and the shared processing module or the shared storing module; and
   a display module and an input module both of which are connected with the shared processing module, wherein the display module is used for providing display interface when said computer mode processing module is handling the data service or when said cell phone mode processing module is handling the voice service, and the input module is used for providing human-machine interactive input processing when said computer mode processing module is handling the data service or when said cell phone mode processing module is handling the voice service; wherein the display module is a display with two or more screens; the input module includes a QWERTY keyboard and digital keyboard, or a QWERTY keyboard and digital keyboard realized by a touch screen or electromagnetic screen; or the display module is a single display, and the shared processing module is provided with a quick shifting key for shifting between the voice service and the data service.

2. The hand-held device according to claim 1, wherein the shared storing module is a solid state disk.

3. The hand-held device according to claim 1, wherein the shared data includes communication information, multi-media file information and safety certificate information required when processing the data service and the voice service.

4. The hand-held device according to claim 1, wherein the computer mode processing module includes a computer operating system, a computer memory, a computer processor, and a built-in storage; and the cell phone mode processing module includes a cell phone operating system, cell phone processor, and a memory.

5. The hand-held device according to claim 4, wherein the built-in storage is an HDD (hard disk drive) disk, SSD disk (solid state disk) or HHD hybrid disk.

6. The hand-held device according to claim 1, further comprising:

a video input module for inputting video information by the user;

a wireless module for accessing into wireless network;

an interface module for providing kinds of interfaces for physical devices;

an audio module for inputting audio information;

the video input module, wireless module, interface module and audio module are all connected to the shared processing module.

* * * * *